Feb. 17, 1948.   E. A. ROBERTSON   2,436,077
PORTABLE LIQUID FILTERING APPARATUS
Filed May 13, 1944   2 Sheets-Sheet 1
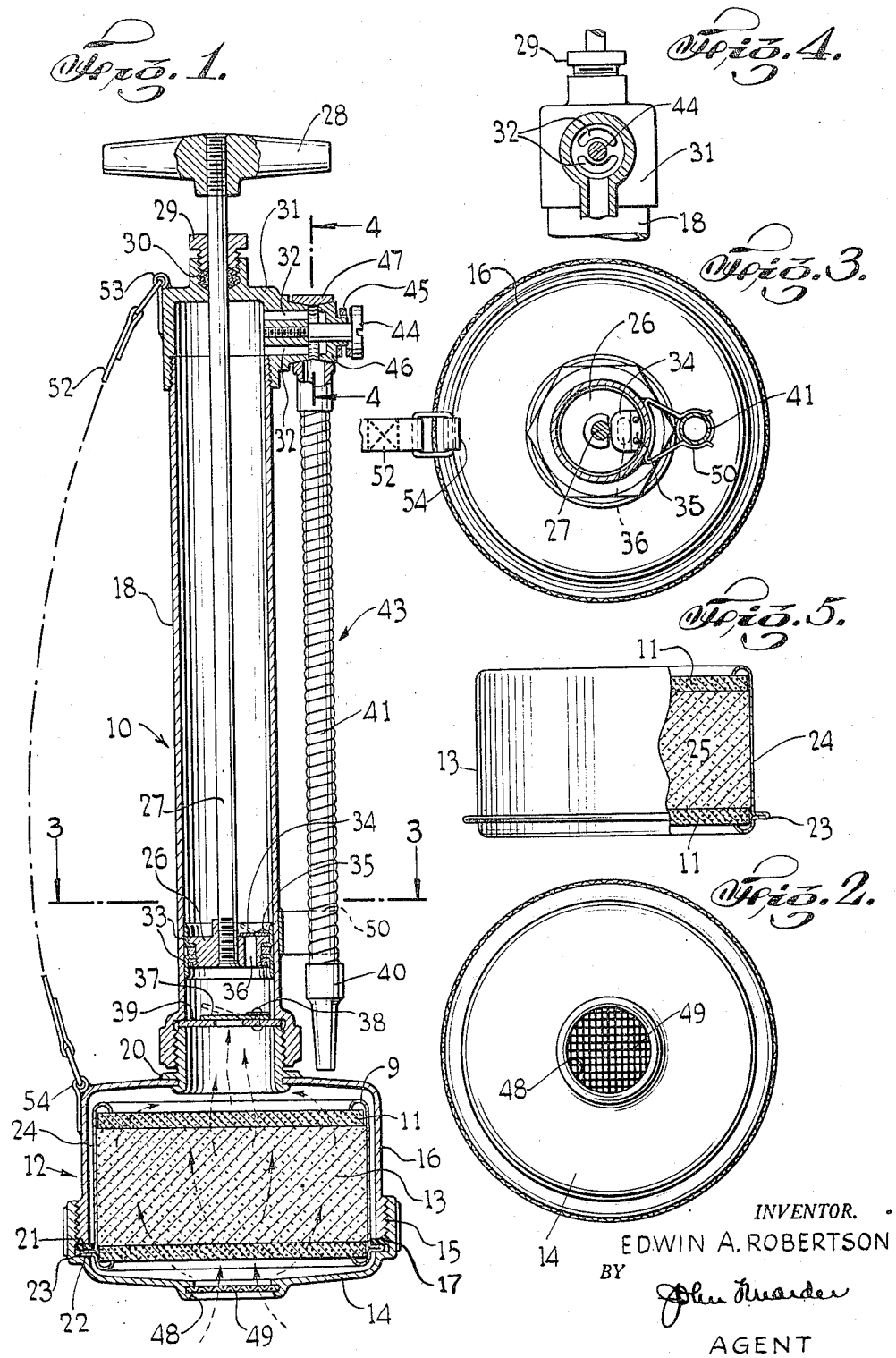
INVENTOR.
EDWIN A. ROBERTSON
BY
AGENT Feb. 17, 1948. E. A. ROBERTSON 2,436,077
PORTABLE LIQUID FILTERING APPARATUS
Filed May 13, 1944 2 Sheets-Sheet 2
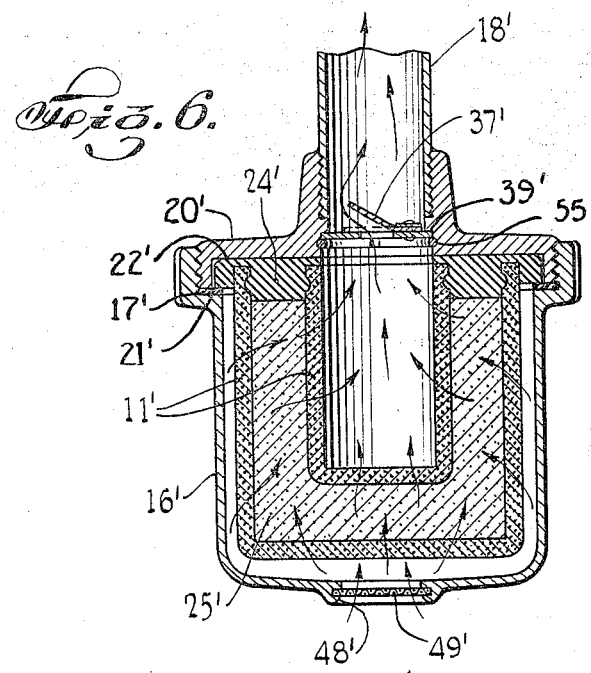
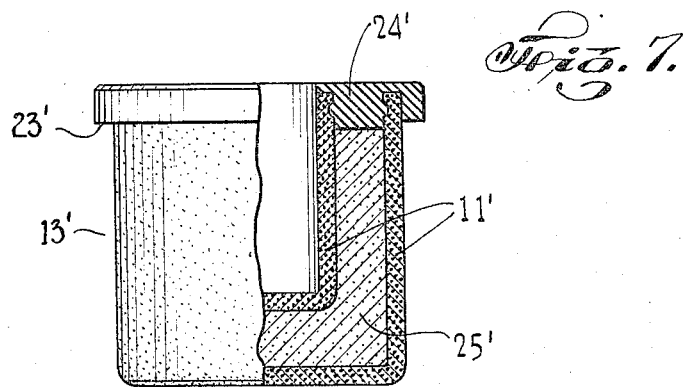
INVENTOR.
EDWIN A. ROBERTSON
BY
AGENT Patented Feb. 17, 1948

2,436,077

UNITED STATES PATENT OFFICE 2,436,077

PORTABLE LIQUID FILTERING APPARATUS

Edwin A. Robertson, Sandusky, Ohio, assignor, by mesne assignments, to Titeflex, Inc., Newark, N. J., a corporation of Delaware Application May 13, 1944, Serial No. 535,431

1 Claim. (Cl. 210—94)

This invention relates to improvements in liquid filtering apparatus. In particular, it deals with portable filtering devices which may be used to remove suspended particles from contaminated water by screening, straining, clarifying, and filtering as the requirements dictate, so that the contaminated or unfiltered water can be converted to water which is fit for human consumption and use.

Many efficient methods of filtering liquids have been devised and filtering media comprise a great variety of substances. Mechanical equipment used in filtering consists mainly of pumping devices to circulate liquid, various tanks and piping for supply and conveyance of filtered and unfiltered liquid, and the filtering unit. If a filter-aid is employed it becomes necessary to supplement the basic filtering equipment described above with such devices, conveyances, and apparatus as may be required for storing, back-flushing, or for other functions which are added to the process.

When removing relatively large solids from liquids it is practical to use merely a mesh screen corresponding to the size of the particles to be removed. As the size of the particles in suspension decreases, filtering is accomplished with such porous materials as stone or cloth. In order to remove particles which are extremely small and which pass through the usual porous materials it becomes necessary to employ granular or powdered filter material or filter-aid such as asbestos, diatomaceous earth, activated carbon, and like substances which may also include properties of adsorption, bleaching, or polishing to the mechanical screening properties.

In commercial filtering procedures, fairly large quantities of liquid are considered. Equipment for such filtering applications is, therefore, extensive and bulky. Automatic controls are involved in conjunction with the equipment and prime movers of some description are necessary for driving pumps or accessories to the filtering apparatus. It is an object of this invention to provide a filtering apparatus which is portable and manually operable, and which can be readily adapted to filter liquids efficiently in relatively small quantities. A further object of this invention is to provide a portable filtering unit which can be adapted to filtering out solids of various sizes and descriptions from liquids and particularly for filtering water for human use and consumption. Still further objects of my invention are to provide a filter of simple and durable construction with all parts contained as a unitary structure having a replaceable cartridge-type filter medium and which may be used by soldiers, campers, explorers, or other individuals who require filtered water in locations which are remote from a supply of potable water.

With these and other objects in view which will be apparent throughout the description, the invention resides in the novel construction, combination and arrangement of parts substantially as hereinafter described and more particularly defined by the appended claim, it being understood that such changes in the precise embodiment of the invention may be made as come within the scope of the claim.

The accompanying drawings illustrate examples of physical embodiments of the invention constructed according to the best modes so far devised for the practical application of the principles thereof and in which:

Figure 1 is a longitudinal view principally in section showing a typical style of filter unit employing my invention;

Figure 2 is an end elevation view taken from below the filter unit;

Figure 3 is a transverse section taken on the line 3—3, Figure 1;

Figure 4 is a fragmentary section view taken on the line 4—4, Figure 1;

Figure 5 is an elevation view partially in section showing a replaceable filtering medium used with my invention;

Figure 6 is a longitudinal view in section showing a modified design of the filter portion of the unit; and Figure 7 is a view partly sectioned showing a modified design of a replaceable filtering medium.

Referring to the drawings in which like numerals are used to identify like parts throughout the several views, numeral 10, Figure 1, generally indicates a hand pump employed to draw unfiltered liquid through a filter portion 12 and to discharge filtered liquid from a hose assembly generally indicated at 43.

The pump 10 comprises a tubular metal barrel 18 having a smooth inner surface which terminates at its upper extremity in an open end with external threads to which a discharge cap is attached, and at its lower extremity in an enlarged portion with a hexagonal exterior and internal threads for attaching a filter housing. Slideably disposed within the pump barrel 18 is a pump piston 26 constructed of metal or other suitable material which is threadedly fastened to a piston rod 27. A pump handle 28 is fastened on the end of the piston rod 27 opposite to the piston end and is provided in order to permit manual operation of the assembly as will be later described.

The filter retainer housing 16 is assembled to the lower portion of the pump barrel 18 at the female thread heretofore described. This housing is of generally cylindrical configuration comprising a relatively thin-walled metal portion to which is assembled the hollow outlet 20 which permits passage of liquid to the pump from the filter portion. The outlet 20 may be joined to the housing 16 as by spinning over its end opposite the male threaded portion, thereby retaining a projecting circumferential shoulder against the housing. The joint may be additionally strengthened by soldering or brazing, also gasketed if it is desirable in making it leak-proof.

The lower end of the housing 16 is provided with male exterior threads 15 for attaching the disk shaped housing cap 14. It will be noted that this assembly of the cap 14 to the housing 16 serves to retain a replaceable filter cartridge 13 in fixed location within the housing. A projecting flange 23 circumferentially disposed on the replaceable filter cartridge 13 serves as a support in the assembly of the housing 16 and cap 14, wherein this flange 23 is held in place between the face 21 on the housing and the ledge 22 on the cap. The flange 23 also serves to prevent positioning of the replaceable cartridge 13 in the filter unit in a reverse direction to that which is intended in the cartridge design. If it is desirable, a ring gasket 17 may be placed as shown in Figure 1 between the flange 23 and the face 21 in order to insure a leak-proof joint between the housing 16 and cap 14 and for preventing seepage of contaminated water through this joint.

Referring now to Figure 5, the filter cartridge 13 comprises a thin metal shell 24 fabricated of readily deformable material. Rolled-in edges on the top and bottom serve to retain two rigid disk filters 11 in place, between which is a contiguous layer of powdered or granular filtering material 25 such as asbestos, diatomaceous earth, or activated carbon. If it is desirable, this material 25 may be constituted of a mixture of substances for a particular application, or it may comprise layers of different materials. The rigid disk-like filters 11 may be constructed of stone as carborundum or of other material having desired porosity and filtering properties. Material specifications for the replaceable cartridge are chosen to perform a desired filtering function of clarification or cold sterilization depending upon the conditions of the unfiltered liquid.

When assembling the filtering cartridge 13 the retaining shell 24 may have one of its inturned ends formed prior to the assembly operation and a single disk 11 set in position on the ledge provided thereby. Subsequently, the powder-like material 25 may be inserted in a measured quantity in this sub-assembly and over this would be placed the second filter disk 11. The final operation in the assembly of this cartridge would be turning-in the opposite end to complete the cartridge in a manner which would hold the second disc in place and prevent the loose material from falling out.

In an alternative construction as shown in Figure 7 the replaceable filter cartridge 13' may be made of two rigid cup-shaped filters 11' of dissimilar sizes situated one within the other between which is the powdered or granular filtering material 25'. A rubber or plastic cap 24' may be moulded over the open ends of cup filters 11' to seal the powdered material between the cups. This modification as shown in Figure 6 assembled with component parts provides a greater filter area per unit of filter diameter than the modification of Figure 5. Housing 16' is provided with female threads for assembly with an outlet fitting 20' on the pump barrel 18'. Replaceable filter cartridge 13' is retained in position at assembly by locking the ledge 23' between the surface 22' on the fitting 20' and the ledge 21' on housing 16'. Gasket 17' would be employed to seal the joint at this location.

As will be noted in Figure 1, a circular opening 48 is provided at the lower extremity of the filter portion of the unit. A coarse screen 49 is rigidly fastened in place within this opening to prevent the passage of coarse solids into the pump. A flap valve disk 39 with a centrally disposed opening is interposed at the junction of outlet 20 and pump barrel 18. Flexible closure member 37 is fastened to the valve disk 39 by pin 38 to permit passage of liquid in an upward direction only when the pump is held upright. In the modification shown in Figure 6 this flap valve, comprising the disk element 39', and the attached flexible closure element 37' are retained in position in a counterbore in outlet 20' by means of a suitable open spring ring 55 which may be snapped in a recess in the counterbore provided.

Likewise the piston 26 is provided with a longitudinally disposed opening 36 which is sealed by flexible flap valve 34 pinned to the piston at 35 permitting liquid to pass upwardly only with respect to the pump. The flexible piston packings 33 directed upwardly and downwardly from the central circumferential portion of the piston serve as a seal in both directions in the operation of the piston within the pump barrel.

Pump discharge cap 31 is fastened to the top threaded portion of the pump barrel 18. An aperture in the top of cap 31 provides for sliding passage and guiding of the piston rod 27 and a packing 30 is disposed in a cup-shaped portion at the top of cap 31 above this aperture. This packing material is held in place by the threaded bushing 29 and serves to seal this opening against leakage during reciprocation of the piston 26 without undue binding. At the side of the cap 31 are the radially disposed ports 32, more clearly shown in Figure 4, which permit passage of liquids from the pump barrel. The specially constructed inside tapered hose connection 47 is rotatably fitted against the correspondingly outside tapered projection on cap 31 and over ports 32 in order to guide liquid from the pump to the hose 41 attached to hose connection 47, and thence to the nozzle 40. A seal is provided at the rotatable fitting 47 by outside tapered plug 46 which is restrained against the inside taper in the fitting 47 by pressure of the spring 45 disposed between plug 46 and screw 44 threadedly fastened to the circular portion of the ribbed section of cap 31 between ports 32.

Unrestricted swinging of the hose assembly 43 is possible when hose 41 is detached from clip 50 to direct the filtered liquid in any direction or to a suitable container. When the pump is not in operation flexible hose element 41 may be locked against the barrel of the pump by spring clip 50 rigidly attached to the barrel 18. A strap 52 fastened to the pump cap at 53 and to the housing 16 at 54 may be used to provide a sling in the event that it is desirable to carry the filter unit over an arm or shoulder.

In operation the filter unit may be dropped into a suitable source of water supply so that the screened opening 48 is immersed. The piston is then reciprocated, the operator holding the pump barrel 18 in one hand and the pump handle 28 in the other hand. Considering now the flow of liquid, the upward travel of piston 26 will create vacuum in the filter portion tending to draw in liquid from the water supply. Primary screening will take place as the liquid passes through opening 48. Thereafter, the lower filtering disk or cup 11 will serve to restrain a large quantity of suspended material.

Further filtering and clarification is effected as the liquid continues upwardly in the direction of the arrows through the powdered or granular material 25 and thence through the upper filter disk or cup 11. When the liquid reaches the lower portion of the pump barrel above the filter cartridge the process of filtration or cold sterilization is completed. Thereafter, passage through the pump is merely a matter of direction and flow as the result of pressure exerted by the pump mechanism. Since one-way valves are provided in the lower portion of the pump barrel and in the piston, a complete cycle will be: first, on the upward stroke of the piston, the withdrawal of liquid during which operation air is displaced from above the piston; and, second, on the downward stroke, liquid remains in the pump barrel by forced closure of the flap valve in the lower portion of the pump barrel, and the piston is permitted passage downwardly through this liquid by forced opening of the flap valve in the piston. Each of the following upward strokes will withdraw liquid below the pistons and discharge liquid above the piston.

Flow of filtered liquid will be carried on until the screen or filter cartridge becomes completely clogged with suspended material. At this time discharge will no longer take place and it will be necessary to provide a replacement filter cartridge. The quality of liquid being filtered will determine the quantity permitted to flow through the filter unit before such replacement becomes necessary.

It is to be understood that the form of my invention, herewith shown and described, is to be taken as a preferred example of the same, and that various changes in the shape, size, and arrangement of parts may be resorted to, without departing from the spirit of my invention.

Having thus described the invention, what is claimed as new and desired to be secured by Letters Patent is:

In a portable filtering apparatus, in combination, a filter housing having an outlet opening, a filter housing cap threadedly joined to said filter housing and provided with an intake opening, a replaceable filter cartridge within said filter housing, said cartridge having an impervious open-ended shell within the ends of which are situated a pair of rigid pervious filter discs separated by a layer of loose filtering material, said cartridge being secured in place within said housing by the joinder of said housing and said cap, a sealing gasket between the filter housing and the exterior of the filter cartridge whereby all fluid passing through the filter housing must pass within the filter cartridge, a manually operable liquid pump in threaded engagement with the filter housing and having an intake communicating with the housing outlet, a discharge port on the liquid pump, and a discharge conduit in communication with said discharge port, said discharge conduit including a fitting swivelably fastened to the liquid pump at the discharge port whereby the discharge conduit may be moved with respect to the discharge port during filtering.

EDWIN A. ROBERTSON.

REFERENCES CITED

The following references are of record in the file of this patent:

UNITED STATES PATENTS

| Number | Name | Date |
|---|---|---|
| 1,556,426 | Coop | Oct. 6, 1925 |
| 1,751,017 | Sullivan | Mar. 18, 1930 |
| 1,535,112 | Duke et al. | Apr. 28, 1925 |
| 252,858 | Adsit | Jan. 31, 1882 |
| 449,607 | Beebe | Mar. 31, 1891 |
| 2,098,102 | McLean | Nov. 2, 1937 |
| 1,297,603 | Smith | Mar. 18, 1919 |
| 1,646,377 | Sweetland et al. | Oct. 18, 1927 |
| 2,048,350 | McLean | July 21, 1936 |
| 629,387 | Nordtmeyer | July 25, 1899 |
| 999,759 | Dondey et al. | Aug. 8, 1911 |
| 559,590 | Miles | May 5, 1896 |
| 560,261 | Durant | May 19, 1896 |
| 2,222,123 | Schwab | Nov. 19, 1940 |
| 1,208,515 | Dilley | Dec. 12, 1916 |
| 2,071,550 | Matheson | Feb. 23, 1937 |
| 2,233,093 | Carman et al. | Feb. 25, 1941 |
| 1,723,374 | Roehr | Aug. 6, 1929 |
| 109,592 | Curtis | Nov. 29, 1870 |
| 789,751 | Metcalf | May 16, 1905 |

FOREIGN PATENTS

| Number | Country | Date |
|---|---|---|
| 80,283 | Germany | Apr. 29, 1895 |
| 198,700 | Switzerland | Dec. 1, 1938 |
| 1,415 | Great Britain | 1884 |